US006983986B2

(12) United States Patent
Jane Santamaria

(10) Patent No.: US 6,983,986 B2
(45) Date of Patent: Jan. 10, 2006

(54) DEVICE FOR REMOVABLY FITTING CARRYCOT SEATS AND CARRYCOTS TO BABY CARRIAGES

(75) Inventor: Manuel Jane Santamaria, Palau de Plegamans (ES)

(73) Assignee: Jane, S.A., Palau de Plegamans (ES)

( * ) Notice: Subject to any disclaimer, the term of this patent is extended or adjusted under 35 U.S.C. 154(b) by 0 days.

(21) Appl. No.: 10/752,941

(22) Filed: Jan. 6, 2004

(65) Prior Publication Data
US 2004/0164593 A1    Aug. 26, 2004

(30) Foreign Application Priority Data
Jan. 9, 2003    (ES)    ................................ 200300028

(51) Int. Cl.
B62B 7/14    (2006.01)
(52) U.S. Cl. .................................... 297/130; 297/183.1
(58) Field of Classification Search ................ 297/130, 297/183.1, 183.2, 250.1, 217.1; 280/30
See application file for complete search history.

(56) References Cited

U.S. PATENT DOCUMENTS

| 5,203,577 A | * | 4/1993 | Kato et al. | ..................... 280/30 |
| 5,522,639 A | * | 6/1996 | Jaime | ..................... 297/184.13 |
| 5,676,386 A | * | 10/1997 | Huang | ..................... 280/30 |
| 5,772,279 A | * | 6/1998 | Johnson, Jr. | ..................... 297/130 |
| 5,865,447 A | * | 2/1999 | Huang | ..................... 280/30 |
| 6,715,828 B1 | * | 4/2004 | Cheng | ..................... 297/183.3 |
| 6,793,280 B2 | * | 9/2004 | Washizuka et al. | ..................... 297/130 |

FOREIGN PATENT DOCUMENTS

| EP | 514054 A | 11/1992 |
| EP | 1029768 A | 8/2000 |
| GB | 2268394 A | 1/1994 |

* cited by examiner

Primary Examiner—Peter R. Brown
(74) Attorney, Agent, or Firm—Merchant & Gould P.C.

(57) ABSTRACT

A device for removably fitting carrycot seats and carrycots to baby carriages. Said carrycot seat or carrycot comprises a rigid, inverted-U handle, and the device is characterized in that each of the lower ends of this handle incorporates a mechanism for its direct anchoring in a respective attachment being laterally provided on the baby carriage, the handle having a control being apt to at the same time actuate the two anchoring mechanisms for simultaneously unlocking them.

The control being provided to actuate said anchoring mechanisms comprises a rotatable cylinder having fixedly attached at each of two opposite points to its periphery a respective rope being connected to the respective anchoring mechanism, said cylinder and ropes being located in the hollow inside of the handle. The cylinder has an actuation appendage projecting through an opening being provided in the lower region of the central section of the handle.

4 Claims, 1 Drawing Sheet

DEVICE FOR REMOVABLY FITTING CARRYCOT SEATS AND CARRYCOTS TO BABY CARRIAGES

FIELD OF THE INVENTION

This invention relates to a device for removably fitting carrycot seats and carrycots to baby carriages.

BACKGROUND OF THE INVENTION

It is already known to removably fit to a pushchair for babies a baby seat or a carrycot that are rigid and generally incorporate an also rigid handle, the baby being accommodated in said seat or carrycot until after some months it can be already accommodated in the conventional seat of the pushchair. Said fitting is carried out by means of devices comprising on each side of the baby carriage a holder being apt to removably hold the carrycot seat.

Said holders are generally complex and unsightly and are provided with the corresponding controls allowing to individually unlock the mechanisms holding the carrycot seat or carrycot.

SUMMARY OF THE INVENTION

This complexity as regards both the manufacture of these devices and their use is obviated with the device being the object of this invention, this latter advantageously allowing to simultaneously unlock both lateral anchoring mechanisms with one only control being located at the central section of the very inverted-U handle, the pushchair for babies being provided with simple lateral boxes being apt to receive said anchoring mechanisms.

The person handling the baby carriage can thus unlock the fastening of the carrycot seat or carrycot with the very hand having hold of the handle, so that on top of the substantial ease being gained by this the other hand remains free and can be used to carry he bay in one's arm, for example.

This device is characterized in that each of the lower ends of the handle incorporates a mechanism being apt to bring about a direct anchoring in said boxes, said mechanisms being apt to be unlocked by said single control.

This control comprises a rotatable cylinder having fixedly attached at opposite points to its periphery respective ropes being each respectively connected to each of the respective anchoring mechanisms, this whole arrangement being housed in the hollow inside of the handle, said cylinder having an actuation appendage projecting through an opening being provided in the lower region of the central section of the handle.

These land other characteristics will be best made apparent by the following detailed description whose understanding will be made easier by the accompanying sheet of drawings showing a practical embodiment cited only by way of example not limiting the scope of the present invention.

DESCRIPTION OF THE PREFERRED EMBODIMENT

Figure 1:
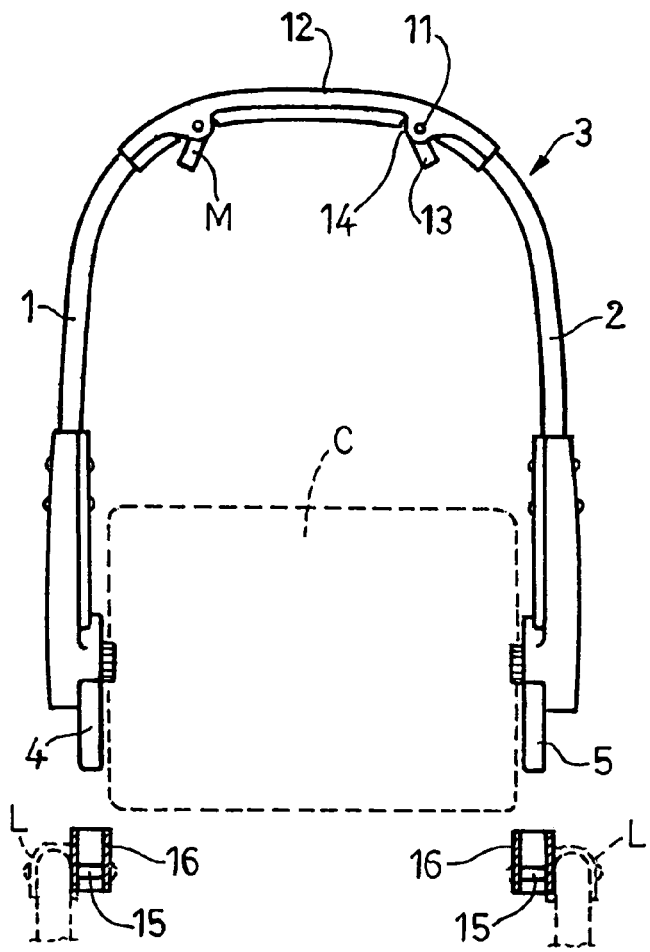
FIG. 1 illustrates in an elevational front view the assembly making up said fitting device.
Figure 2:
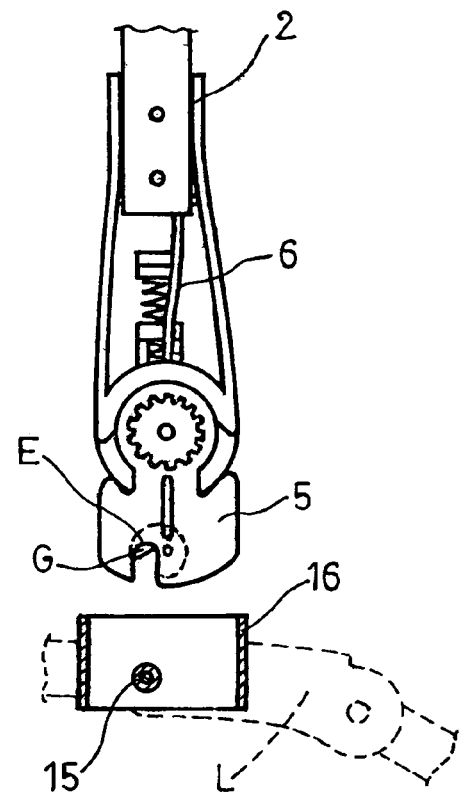
FIG. 2 shows in an elevational side view the inside of a lower end of the handle facing the box wherein it is to be held.
Figure 3:
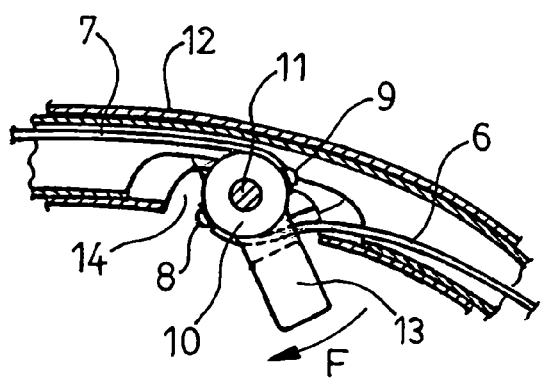
FIG. 3 shows in a longitudinal section the makeup of the unlocking control.
Figure 4:
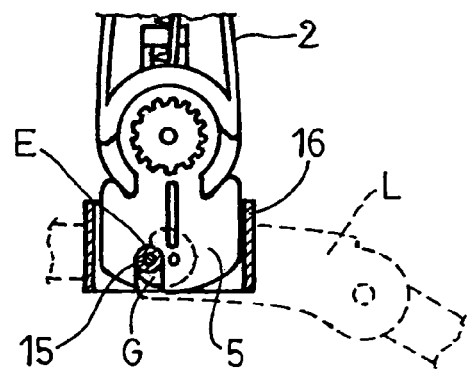
FIG. 4 is a detail view showing in a side elevation the anchoring of a lower end of the handle.

According to the drawings this device for removably fitting carrycot seats or carrycots to baby carriages comprises at each of the lower ends of the branches (1) and (2) of the rigid and hollow handle (3) a respective anchoring mechanism (4) and (5), said anchoring mechanisms being both actuated at the same time to thus be unlocked by means of respective ropes (6) and (7) having their upper ends fixedly attached to opposite points (8) and (9) of a cylinder (10) being rotatable around a pin (11) being fitted to an upper attachment (12) being fitted to the handle, said cylinder being integrally provided with a radial appendage (13) being apt to allow to actuate it and projecting through a lower opening (14) being provided in the central region of the handle.

The anchoring mechanism has a catch (G) being apt to engagedly seize a transverse pin (15) being fixedly arranged in the inside of a box (16) being apt to be attached to the sides (L) of the chassis of the pushchair. The engagement between this catch and the above-mentioned pin takes place in an automatic manner when when introducing the mechanisms (4) and (5) into the respective boxes (16) the former are fitted onto the respective pins (15) by means of the vertical notch (E) where the catch (G) is located.

In order to unlock the anchoring mechanisms it will suffice with laterally actuating the appendage (13) as per arrow (F) in order to thus pull both ropes (6) and (7) and to thus act on said mechanisms thus releasing the catches (G) from the respective pins (15).

The handle (3) is articulately linked at its lower ends to the sides of the carrycot seat or carrycot (C), said handle also comprising a control (M) being apt to simultaneously actuate the mechanisms being provided to lock the different angular positions that can be adopted by the handle, said conventional mechanisms being also located at the lower ends of the handle.

The invention can within its essentiality be put into practice in other embodiments differing only in detail from the one having been described above only by way of example, said other embodiments also falling within the scope of the protection being claimed. This device for removably fitting carrycot seats and carrycots to baby carriages can hence be manufactured with the best suited means and materials and with the most convenient accessories, and its integrating elements can be replaced with others being technically equivalent, all this falling within the spirit of the appended claims.

The invention claimed is:

1. A device for removably fitting carrycot seats or carrycots to a baby carriage, the baby carriage having lateral receivers, wherein the carrycot seat or the carrycot comprises:
    a rigid and hollow inverted-U shaped handle with lower ends, the handle having:
    ropes, each rope having a first end and a second end,
    an anchoring mechanism incorporated at each of the lower ends of the handle to facilitate direct anchoring in the respective lateral receiver provided on the baby carriage, and
    a first control to simultaneously actuate and unlock the anchoring mechanisms,
    wherein the first control includes a rotatable cylinder, and wherein the first end of each rope is fixedly attached at opposite points about the periphery of the rotatable cylinder and the second end of each rope is connected to the respective anchoring mechanism.

2. The device of claim 1, wherein the cylinder and the ropes are located inside of the handle, and wherein the handle further defines an opening, wherein said cylinder has an actuation appendage projecting through the opening provided in a lower region of a central section of the handle.

3. The device of claim 1, wherein each lateral receiver is fixedly attached to the baby carriage and has a respective transverse pin, and wherein each anchoring mechanism comprises a catch to engagedly seize the respective transverse pin, and wherein the respective pin is provided in the respective lateral receiver, receiving the respective anchoring mechanism.

4. The device of claim 1, wherein the carrycot seat or the carrycot further comprises articulated connections, and the handle further comprises a second control and lock mechanisms, wherein the articulated connections connect the handle to the carrycot seat or the carrycot, and wherein the second control is located in a middle section of the handle to simultaneously actuate the lock mechanisms provided to lock at different angular positions of the handle.

* * * * *